United States Patent [19]

Cholat-Namy

[11] Patent Number: 4,477,898

[45] Date of Patent: Oct. 16, 1984

[54] PROCESS FOR DETERMINING ACTIVE CHANNEL CONFIGURATIONS IN A MULTIPLEX COMMUNICATIONS SYSTEM AND A SYSTEM FOR IMPLEMENTING SAID PROCESS

[75] Inventor: Jean Cholat-Namy, Juan Les Pins, France

[73] Assignee: International Business Machines Corporation, Armonk, N.Y.

[21] Appl. No.: 368,600

[22] Filed: Apr. 15, 1982

[30] Foreign Application Priority Data

Apr. 30, 1981 [EP] European Pat. Off. ........... 81430012

[51] Int. Cl.³ .............................................. H04J 3/00
[52] U.S. Cl. ....................................... 370/80; 370/84; 370/92
[58] Field of Search ....................... 370/80, 79, 84, 92, 370/56

[56] References Cited

U.S. PATENT DOCUMENTS

| | | | |
|---|---|---|---|
| 3,652,997 | 3/1972 | Cromleigh | 340/172.5 |
| 3,708,625 | 1/1973 | Angekri et al. | 370/79 |
| 3,876,838 | 4/1975 | Boxall | 370/80 |
| 3,975,593 | 8/1976 | Fick | 370/84 |
| 3,982,974 | 9/1976 | Clark | 179/15 BV |
| 4,093,823 | 6/1978 | Chu | 370/92 |

FOREIGN PATENT DOCUMENTS

| | | |
|---|---|---|
| 2122102 | 7/1971 | France . |
| 2197292 | 7/1973 | France . |
| 1310772 | 3/1973 | United Kingdom . |
| 2066024 | 7/1981 | United Kingdom . |

*Primary Examiner*—Douglas W. Olms
*Assistant Examiner*—Frank M. Scutch, III
*Attorney, Agent, or Firm*—John B. Frisone

[57] ABSTRACT

In a variable configuration multiplex transmission method, correct sending of data to their respective addressees (terminals 22, 24, 26 and/or 28) supposes that reception station (34) can determine which is the channel configuration from amongst configurations (A, B, C and/or D) that is active. This invention is adapted to proceed to such a channel determination by multiplexing a predetermined particular character from the active channels, directly transmitting over transmission channel (32) the multiplexed predetermined character burst, receiving (34) the multiplexed character burst, and using the received character burst in order to read a pre-registered table which directly gives out that channel configuration which has active channels.

5 Claims, 4 Drawing Figures

PROCESS FOR DETERMINING ACTIVE CHANNEL CONFIGURATIONS IN A MULTIPLEX COMMUNICATIONS SYSTEM AND A SYSTEM FOR IMPLEMENTING SAID PROCESS

BACKGROUND OF THE INVENTION

1. Field of the Invention

This invention concerns digital communications and, more specifically, communications wherein multiplexing techniques are used to concentrate several digital channels onto a single transmission channel.

2. Background of the Invention

Since manufacturing lines or, more generally, manufacturing communications channels, is an expensive operation, it is of interest to handle these lines to the best of their capacities. To this end, a number of techniques have been developed from amongst which are the so-called multiplexing techniques owing to which data coming from several channels are concentrated, on the transmission side, into a single common channel. The information conveyed by said common channel, must then be processed, on the reception side; more specifically, it must be demultiplexed, in order to send the received information to the addressees they are intended for. These addressees are either respectively connected to separate channels (point to point communications) or all connected to a same channel (multipoint communications). Hybrid systems are also provided wherein several channels are provided at the demultiplexer output, with some of these channels being connected in point to point configuration and others being connected in multipoint configuration. In any case, however, the configuration of the whole communications network, as a rule, must be perfectly defined and known of both the multiplexer and demultiplexer so that the pieces of information can be sent to their appropriate addressees, respectively, after their being conveyed onto said common channel. Besides, at any moment, some channels may be active and others be inactive. The configuration of the active channels should be adapted to be modified according to the needs so that the common channel can be handled for the best of the user's interest. That is why, though it is of interest to concentrate as many communications, i.e. channels, as possible, onto said common channel, the transmission conditions may require a reduction of the number of the simultaneously activated channels. In other words, the conditions, e.g. the atmospherics, may disturb the transmissions in a way such that only those communications which come from a number of channels lower than the total number of the channels connected to the system, will be concentrated onto said common channel. Therefore, some channels previously connected to the common channel will momentaneously be left inactive. It can easily be understood that when some channels are left inactive on the transmission side, (multiplexing side), the demultiplexer at the other end of the common channel must obviously be aware of that so that the received data can be sent to their addressees, respectively, i.e., so that the channel configuration on the Reception side be adapted to the channel configuration on the Transmission side.

Generally, a same channel is used for both the emission and reception operations. Consequently, the user, or the terminal connected thereto, fulfills both emission and reception functions. Therefore, the demand for modifying the configuration of the active channels could come from either of the ends of the common channel. In practice, however, the station, at one of the ends of the common channel, has a master function whereas the station at the other end, has a slave function. The decision to modify the active channel configuration as well as the choice of the best configuration at a given instant, will be made at the master station, and the slave will have to conform by modifying the configuration of the active channels which are connected thereto, accordingly. Of course, it results therefrom that the devices on the slave side must be aware of the decisions made by the master relative to the active channel configuration, and take the necessary steps for conforming to these decisions. A momentaneous interruption of the useful traffic may occur, which interruption must be reduced to a strict minimum.

Several solutions have already been proposed to solve at best the problems encountered for communicating to the slave the master's decision regarding the active channels configuration selected and for handling such a decision at the slave station. The simplest solution consists in placing an operator at each of the ends of the common communications channel, and providing each operator with a communications means for communicating with the other operator. The slave operator will modify the slave channels configuration according to the instructions received from the master operator. Though this solution is easy to implement, it is rather expensive for the user.

Another proposed solution consists in providing, within the common channel and outside the frequency range normally used therein for the transmission of the data coming from the above-mentioned channels, for a so-called lateral or secondary channel which will be solely reserved for transmitting from master to slave a special message transmitted at a relatively low rate (service speed) and which is indicative of the master's decision made for changing the configuration of active channels. The slave will modify the configuration of its channels in order to match the master's selected configuration, through successive approximations. Such a channel matching method is relatively slow. Besides, it has risks of disturbing the transmission system in that said lateral channel may interfere with the actual data channel.

SUMMARY OF THE INVENTION

Therefore, a primary object of the invention is a process adapted, in a data transmission system wherein several channels are concentrated into a single common transmission channel through a multiplexing operation at the master station and wherein the data are demultiplexed at the other end of said common channel by a slave which sends the data to their addressees, to communicate to the slave the channel configuration chosen by the master, by transmitting in data mode a predetermined character over the master's active channels and determining at the slave station the channel configuration chosen by the master from the received bit pattern.

Another object of this invention is to transmit to the slave over said common channel, the information relative to the channel configuration at the same rate the data are transmitted during the data transmission time periods (data rate).

The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
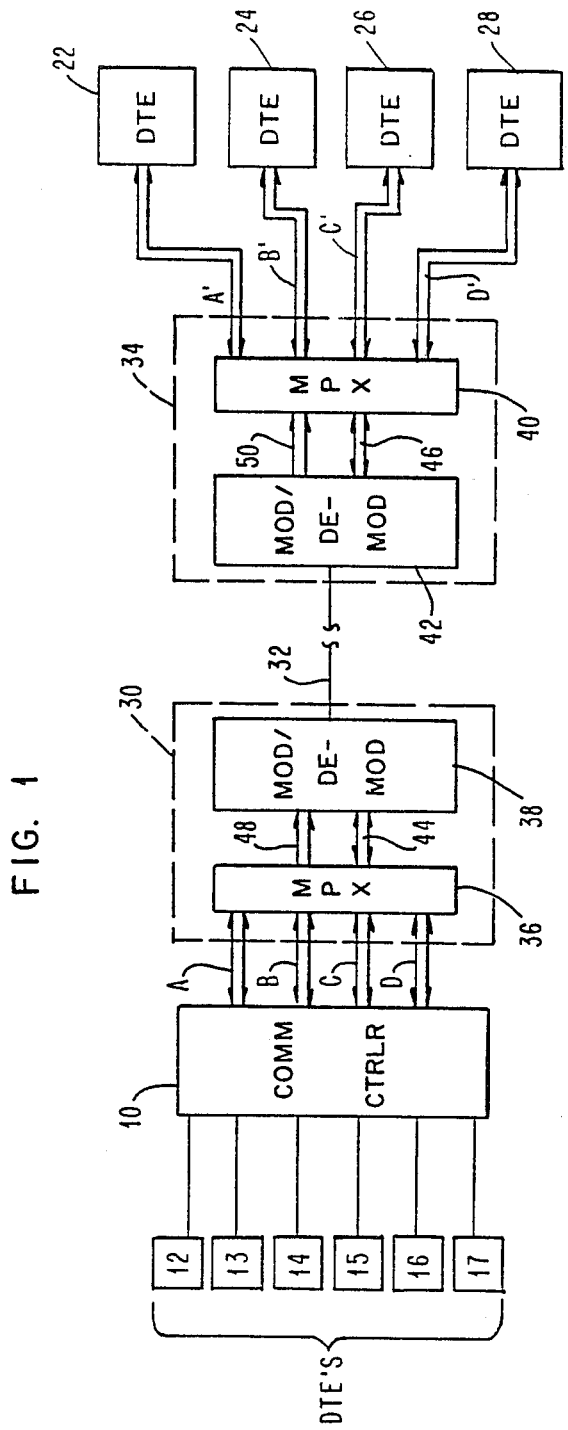
FIG. 1, is the general configuration of a communications system according this invention.

FIG. 1 illustrates the general configuration of a data communications multiplex system. A central system 10 connected to data processing terminal equipment (DTE) 12, 13, 14, 15, 16, 17, is in charge of handling the communications between said DTE's and an assembly of data processing terminals (DTE's) 22, 24, 26, 28. The central system which can be a communications controller, such as an IBM 3705, for instance, and which will be considered here as being itself DTE equipment, is connected to a multichannel modem 30, through channels A, B, C and D. The connections through channels A, B, C and D between the central system 10 and the multichannel modem 30, are carried out according to the CCITT (Comité Consultatif International pour le Télégraphe et le Tél ACu/e/ phone) Recommendation V24 (or V24 type interface). The multichannel modem 30 is connected, through a single common communications channel 32, to another multichannel modem 34 of the same type as multichannel modem 30. Multichannel modem 34 is connected to data processing terminals (DTE) 22, 24, 26 and 28 through channels A', B', C' and D' which are similar to channels A, B, C and D. The junctions between modem 34 and terminals 22 through 28, therefore, are also of the V24 interface type, as defined by CCITT. Each of the multichannel modems 30 and 34 is essentially comprised of two portions. The first portion, designated by 36 or 40 according to the end of the common channel 32 it is connected to, includes a multiplexing device (or multiplex card). The other portion, designated by 38 or 42, is the modem itself. Multichannel modems 30 and 34 can be modems of the type IBM 3865, for instance, which are modified to include the invention as disclosed further on in more detail. Each of the multiplexing devices 36 or 40, is connected to the modem 38 or 42 which corresponds thereto, i.e., which belongs to the corresponding multichannel modem, through a V24 interface, referred to as 44 or 46, and through a bus 48 or 50.

In operation, the data tranitting over channels A, B and D are concentrated onto common channel 32 and then sent to the addressees (here, the terminals) connected to channels A', B', C' and D', respectively. Channels A through D are handled by the central system 10 which, in this case, acts as the master. In a more general manner, it will be assumed that station (10, 30) on the left of the common channel 32 in FIG. 1, is a master station. On the other hand, station 34, at the other end of the common channel 32, will be the slave. More precisely, in the so-called data mode operation and according to a known procedure, the master organizes simultaneous transmission of the data, from its channels (A, B, C, D) to the terminals connected to the slave channels (A', B', C', D'), respectively. The slave handles the communications in the other direction, i.e., from A', B', C' and D' to A, B, C and D. When, for instance, channels A through D have a bit rate of 2400 bits per second (bps), these bits will be multiplexed into a single bit train with a bit rate of 9600 bps, by multiplexing device 36, and this bit train will be transmitted over transmission channel 32, by modem 38. At the other end of transmission channel 32, the bit train will be received by modem 42 and demultiplexed by device 40 so that the bits may be sent to the terminals connected to channels A' through D' respectively. More precisely, the data on channel A will be sent to channel A' and transmitted to DTE 22; the data on channel B, will be transmitted to channel B', and so on. The multiplexing configuration, i.e., the active channels configuration at a given instant, and the bit rates thereof, can vary, such as indicated, for instance, in the CCITT recommendation V29.

Table I, given below, illustrates how a bit train is multiplexed in accordance with the active channels configuration and the chosen transmission rates. It should be noted that the bit train obtained through a multiplexing operation is formed of a succession of four-bit groups (or quadbits) Q1 through Q4. Each quadbit is obtained according to table I by the multiplex card 36 before its being transmitted to modem 38 and then to the slave station, through transmission channel 32.

TABLE I

| Global rate (bps) | Active channel | Active channel rate (bps) | Allocation | | | |
|---|---|---|---|---|---|---|
| | | | Q1 | Q2 | Q3 | Q4 |
| 9600 | A | 9600 | X | X | X | X |
| | A | 4800 | X | | X | |
| | B | 4800 | | X | | X |
| | A | 4800 | X | | X | |
| | B | 2400 | | X | | |
| | C | 2400 | | | | X |
| | A | 2400 | X | | | |
| | B | 2400 | | X | | |
| | C | 2400 | | | X | |
| | D | 2400 | | | | X |
| 4800 | A | 4800 | | X | X | |
| | A | 2400 | | X | | |
| | B | 2400 | | | X | |

Each of the junctions according to the CCITT Recommendation V24 is comprises of a number of lines the functions of which are summarized hereunder.

DSRS (Data Signalling Rate Selector)

(1) To the modem:

This line is used to select one out of two modem bit rates (9600 bps or 4800 bps, depending on the voltage level on DSRS being high or low).

(2) From the modem to DTE:

This line is used to select the bit rate at which DTE must operate.

TD (Transmitted Data):

The data provided by the DTE and to be transmitted are transferred to the modem over this line.

TT (Transmitter Signal Element Timing):

Signals on this circuit provide the modem with signal element timing information.

RTS (Request to Send):

Signals on this circuit control the data channel transmit function of the modem.

TTM (Transmission clock -modem):

The transmission clock signals supplied by the modem are transferred to DTE, through this line.

RFS (Ready for Sending):

Signals on this circuit indicate whether the modem is conditioned to transmit data.

Figure 2A:
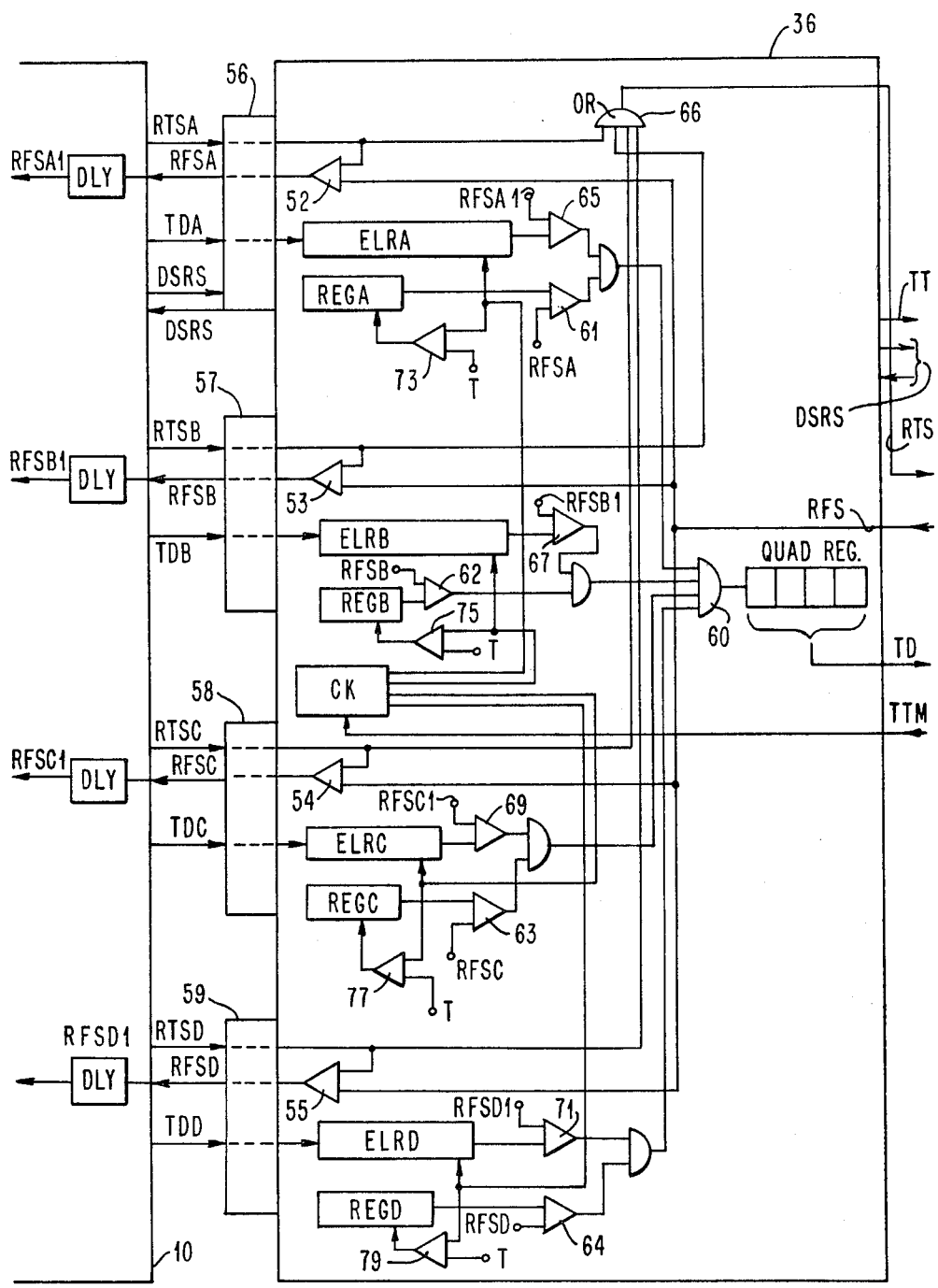
FIGS. 2A and 2B show details of the circuits according to this invention, on the transmission side.
Figure 2B:
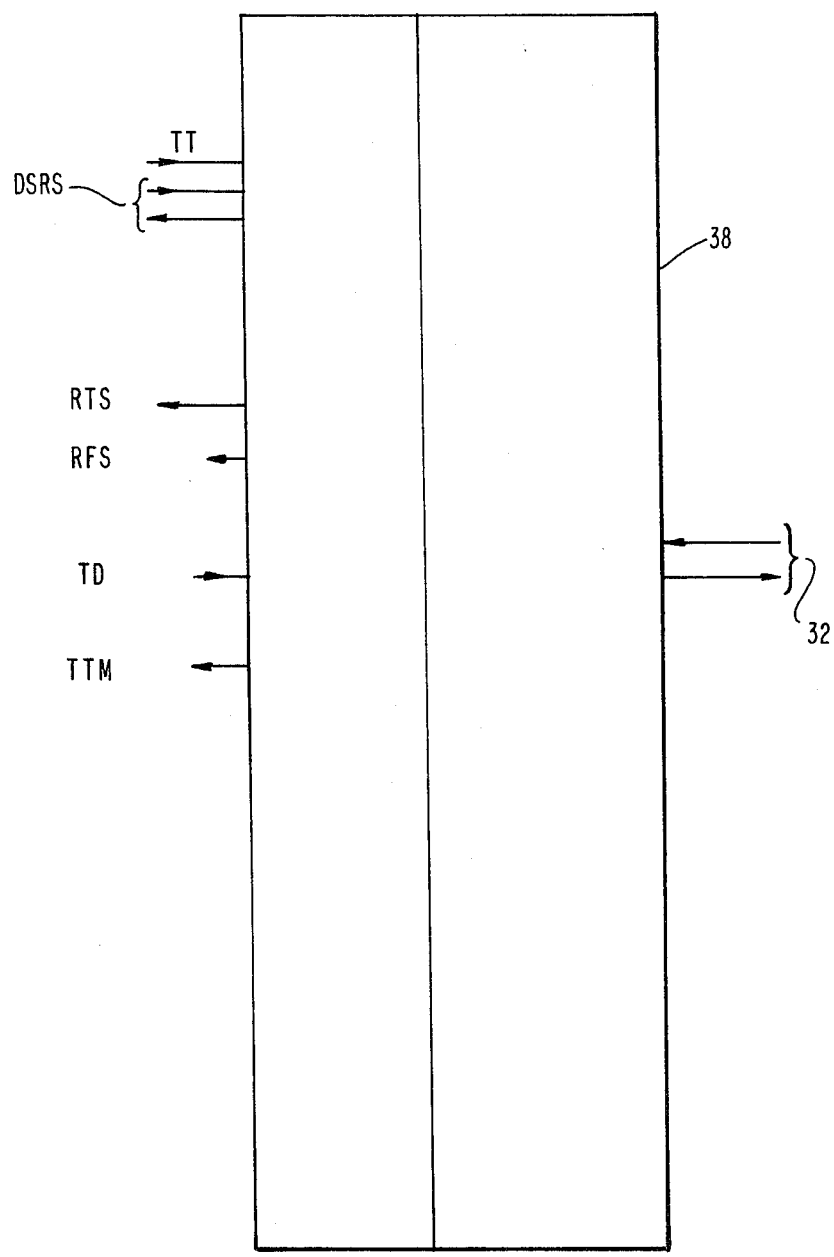

FIG. 2 illustrates the combination of circuit elements added to multichannel modem 30 already existing multiplexing circuits for implementing this invention.

In order to better define the V24 interface lines defined above, with respect to the channel which they belong to, respectively, suffixes A, B, C or D have been added thereto. Line RFS, for instance, which is associated with channel A, is designated by RFSA, etc. . In addition, the interfaces between central system 10 and multiplex card 36, have been designated by 56, 57, 58 and 59.

According to the CCITT procedure, the voltage of the RTS line of the channel which intends to transmit, must be raised from zero volt to a predetermined positive voltage level (high level). More specifically, the central system 10 defines, in terms of the transmission rate (9600 bps or 4800 bps) and the active channels configuration it chooses, which line voltages amongst the voltages of lines RTSA, RTSB, RTSC and/or RTSD, must be raised. The rising voltages are indicated to modem 38, through logic OR circuit 66 and line RTS which comes therefrom. When modem 38 is ready to transmit, it raises the voltage of line RFS. But owing to the use of logic gates 52, 53, 54 and 55, the rising of RFSA, RFSB, RFSC and RFSD is controlled by RTSA, RTSB, RTSC and RTSD, respectively. A delay (DLY) the function of which will be explained further on, is used on RFSA, RFSB, RFSC and RFSD in the controlled element within the central unit 10. Multiplex card 36 has one configuration register REGA, REGB, REGC or REGD per channel. The so-called configuration registers store hexadecimal characters 7E (namely 01111110). This character 7E has been chosen here as the predetermined character used for the active channel configuration operation according to this invention.

The contents of the configuration registers of the channels chosen to be made active are used to build up a so-called configuration sequence which is formed of quadbits built into a register normally used in data transmission mode and already existing in the modem. To this end, outputs REGA, REGB, REGC and REGD are connected to the QUAD REG through OR circuit 60 and gates 61 through 64 which are controlled by RFSA, RFSB, RFSC and RFSD, respectively. The rate at which the configuration registers are unloaded into QUAD REG depends on the chosen transmission rate (9600 or 4800 bps).

This rate information, which is chosen by the central system 10, is fowarded to modem 38, through line TT. In exchange, the modem (see FIG. 2B including a Front End (FE) interface and a modem element) produces a signal TTM which controls the operation of the clock CK of multiplex card 36. Clock CK controls the rate at which the configuration registers REGA, REGB, REGC and/or REGD are unloaded into QUAD REG. The signals of clock CK which are transmitted to the configuration registers, go through gates 73, 75, 77 and 79 which are conditioned by logic signal T. This logic signal is controlled by the rising edge of signal RFS and by clock CK so that character 7E can be sent with the slowest rate that can be used on a channel (here, 1 bit per baud (2400 bits per second)); therefore, this signal T is, in the chosen example, maintained high during a so-called channel configuration period equivalent to 8 bauds. Table II illustrates the quadbits for determining the configuration. Characters 7E, which are stored in configuration registers REGA, REGB, REGC and REGD are multiplexed through register QUAD REG during a period of time equivalent to the time needed for the transmission of one character 7E over the slowest channel, i.e. the channel at 2400 bps.

When the rate on the common channel 32 is selected to be 4800 bits per second (see the bottom portion of Table II), a dibit is formed once per baud in register QUAD REG (wherein only two consecutive bit positions are used) and the two possible transmission cases are:

| (5) | channel A | 2400 bits |
|---|---|---|
|  | channel B | 2400 bits |
| (6) | channel A | 4800 bits. |

Lines QUAD REG (5) and QUAD REG (6) in Table II correspond to that case.

TABLE II

```
                                              V = 9600
        0 1   1 1    1 1   1 0   0 1   1 1    1 1    1 0  A 4800
           0      1      1      1     1      1     1      0  B 2400
       0      1      1      1     1      1     1      0     C 2400
       0001  1111  1111  1110  1011  1111  1111  0100  QUAD REG (1)
       0111  1110  0111  1110  0111  1110  0111  1110  A 9600
       0111  1110  0111  1110  0111  1110  0111  1110  QUAD REG (2)
        0 1   1 1    1 1   1 0   0 1   1 1    1 1    1 0  A 4800
        0 1   1 1    1 1   1 0   0 1   1 1    1 1    1 0  B 4800
       0011  1111  1111  1100  0011  1111  1111  1100  QUAD REG (3)
           0      1      1      1     1      1     1      0  A 2400
           0      1      1      1     1      1     1      0  B 2400
           0      1      1      1     1      1     1      0  C 2400
       0      1      1      1     1      1     1      0     D 2400
       0000  1111  1111  1111  1111  1111  1111  0000  QUAD REG (4)
                                              V = 4800
                          0 1   1 1    1 1   1 0  A 2400
                          0 1   1 1    1 1   1 0  B 2400
                         0011  1111  1111  1100  QUAD REG (5)
                         0111  1110  0111  1110  A 4800
                         0111  1110  0111  1110  QUAD REG (6)
```

Figure 3:
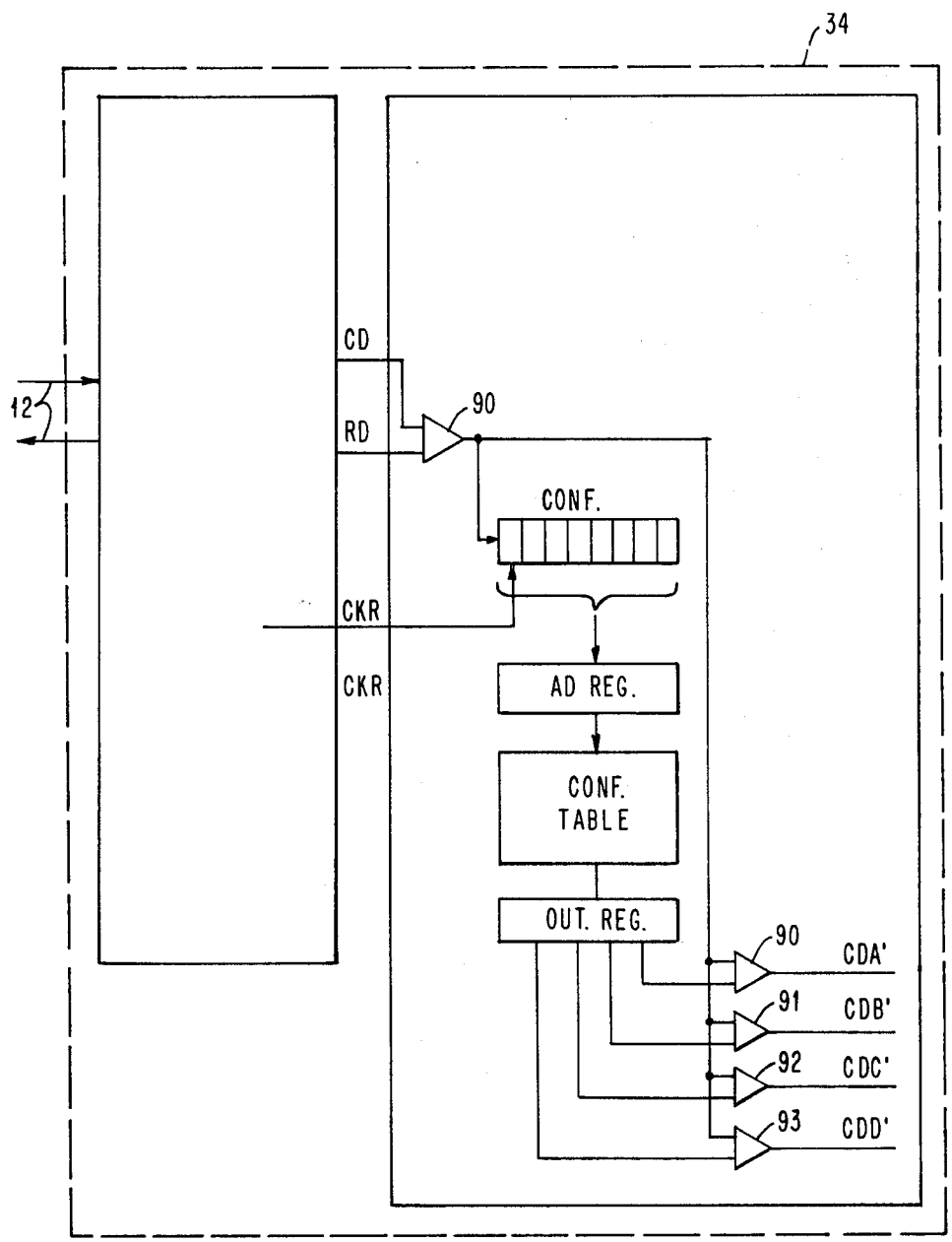
FIG. 3 shows the circuits according to this invention, on the reception side.

The rows in Table II which are designated by QUAD REG are representative of an eight-quadbit configuration sequence, each. For instance, when the master station 10 chooses an active channels configuration including channel A at 4800 bps and Channels B and C at 2400 bps, the corresponding configuration sequence which will be transmitted over the common channel 12 during a configuration period is designated by QUAD REG (1). Transmission over channel 32 will start in the conventional way. It should only be reminded that since the carrier is permanently transmitted, the modem 42 receiver of slave unit 34 will, beforehand, have carried out all the conventional adjusting operations based on the carrier detection. A synchronization sequence intended to put the slave unit 34 into a data receiving condition, is then transmitted by the master station 30, which sequence defines the chosen transmission rate and makes it possible to adjust clock CKR of the slave station receiver (see FIG. 3). This is a standard feature of the commercially available modem identified above. At the end of the synchronization sequence, the voltage on line CD is brought from zero volt to its high level. Such a voltage is used to condition logic gate 90 which enables the configuration determining operation to be started at the slave 34 receiver unit. In other words, the slave station 34 will then start the operations which will enable it to be made fully aware of the active channels configuration selected by the master station 30. The configuration determing quadbits are fed into register CONF. This register can contain two consecutive quadbits. When register CONF is full, it is unloaded into address register AD REG which is used to address a table CONF TABLE the contents of which is illustrated in Table III.

TABLE III

| Address | | | | | | | | Output |
|---|---|---|---|---|---|---|---|---|
| 9600 bps | | | | | | | | |
| 1 | 1 | 1 | 0 | 1 | 0 | 0 | | A 4800; B 2400; C 2400 |
| 0 | 1 | 1 | 1 | 1 | 1 | 0 | | A 9600 |
| 1 | 1 | 1 | 1 | 1 | 0 | 0 | | A 4800; B 4800 |
| 1 | 1 | 1 | 0 | 0 | 0 | 0 | | A 2400; B 2400; C 2400; D 2400; |
| 4800 bps | | | | | | | | |
| 1 | 1 | 1 | 1 | 1 | 0 | 0 | | A 2400; B 2400 |
| 0 | 1 | 1 | 1 | 1 | 1 | 0 | | A 4800 |

The contents of address register AD REG is completed with a bit (equal to zero or to one depending whether the chosen transmission rate is 9600 or 4800 bps) and the whole contents is used to address CONF TABLE. Such a table provides the configuration information. A double checking operation is made possible by using the last two quadbits to address another portion of CONF TABLE, which contains Table IV.

TABLE IV

| Address | | | | | | | | Output |
|---|---|---|---|---|---|---|---|---|
| 9600 bps | | | | | | | | |
| 0 | 0 | 0 | 1 | 1 | 1 | 1 | | A 4800; B 2400; C 2400 |
| 0 | 1 | 1 | 1 | 1 | 1 | 0 | | A 9600 |
| 0 | 0 | 1 | 1 | 1 | 1 | 1 | | A 4800; B 4800 |
| 0 | 0 | 0 | 0 | 1 | 1 | 1 | | A 2400; B 2400, C 2400; D 2400 |
| 4800 bps | | | | | | | | |
| 0 | 0 | 1 | 1 | 1 | 1 | 1 | | A 2400; B 2400 |
| 0 | 1 | 1 | 1 | 1 | 1 | 0 | | A 4800 |

The discrimination between Table III and IV is provided by using an additional address bit to address CONF. TABLE.

Thus, one or two table look ups are sufficient to determine at the slave station the channel configuration chosen by the master station. Once the table look-up operation has been carried out, an assembly of gates 91 through 94 causes the voltages of lines CD of those channels A', B', C' and/or D' chosen to be active, to go to a high level, and the data reception mode, proper, can be started. These data, indeed, will have been sent by the master station over channel 32, following the sequence of the eight configuration determining quadbits. To this end, after a predetermined delay (DLY) equivalent to the time needed for the performance of the channels configuration operations, the lines RFSA, B, C and/or D of the channels selected by the master station for being active, are brought to a high level (RFSA1, RFSB1, RFSC1 and/or RFSD1 at a high level), which conditions gates 65, 67, 69 and/or 71 at the output of data registers ELRA, ELRB, ELRC and/or ELRD. Of course, gates 61, 62, 63 and 64 which are placed at the outputs of registers REGA, REGB, REGC and REGD, respectively must be closed before sending the data. Data transmission is operated in a conventional manner by making use of data registers ELRA, ELRB, ELRC and/or ELRD. The preceding description explains the part played by the delay (DLY) between the moment a high voltage level appears in RFSA, RFSB, RFSC and RFSD and the moment corresponding level RFSA, RFSB1, RFSC1 and RFSD1, rises.

While the invention has been particularly shown and described with reference to a preferred embodiment thereof, it will be understood by those skilled in the art that numerous changes in form and detail may be made therein without departing from the spirit and scope of this invention.

More particularly, the disclosed configuration method can be simplified when the DTE's attached to the master 10 and chosen for being active have normally to send characters 7E in conformity with the well-known SDLC procedure, before proceeding to the data transmission, proper. In that case, the invention can be implemented without using registers REGA, REGB, REGC and REGD and their attached circuits. Likewise, those skilled in the art can select a different predetermined character without departing from the spirit of the invention.

I claim:

1. A multiplex data transmission system for connecting a first plurality of data transmitters each exclusively to one of a second plurality of data receivers via a single multiplex channel comprising:
   first means for receiving data signals from each of the data transmitters and adaptively multiplexing the data signals onto the single multiplex channel as a function of the number and identity of the active data transmitters,
   second means responsive to the transmission requirements of the first plurality of data transmitters for selecting a predetermined one of m channel allocations depending on the received requirements,
   third means associated with each data transmitter for storing a predetermined coded character,
   fourth means for concurrently transmitting for a predetermined time equal to the time required to transmit the predetermined character at the lowest speed allocated on the channel, the said predetermined stored character associated with each active data transmitter each at a rate corresponding to the channel allocation selected by the said second means to provide a unique composite signal, and
   fifth means at said data receivers for decoding at least a portion of the unique composite signal which identifies the channel allocation and for distributing subsequent informational content received from the multiplex channel in accordance therewith to the second plurality of data receivers.

2. A multiplex data transmission system as set forth in claim 1 in which said fifth means includes sixth means for storing at least a portion of the unique composite signal,

- a configuration table for storing control signals each identifying a different one of the said m channel allocations,
- addressing means responsive to the sixth means for reading a corresponding one of the configuration control signals from the configuration table, and
- seventh means responsive to the selected configuration control signals for controlling the distribution of subsequently received signals to the data receivers.

3. A multiplex data transmission system as set forth in claim 1 or 2 in which the said predetermined character is hex 7E (01111110).

4. A multiplex data transmission system as set forth in claims 1 or 2 in which n information bits are transmitted in each signaling baud over the multiplex channel and up to n data transmitters share the transmission capacity of the multiplex channel on an as-needed basis, and the slowest sub-channel information bit rate is equal to the baud rate.

5. A method of operating a multiplex data transmission system which connects a first plurality of data transmitters each exclusively to one of a second plurality of data receivers via a single multiplex channel comprising the steps of:

- at said transmitter site monitoring the transmission requirements of the transmitters, selecting one of m channel allocations as a function of the transmission requirements of the data transmitters, transmitting substantially simultaneously for each said active transmitter a predetermined character at a rate corresponding to the transmission capacity allocated to each said active transmitter all for a period of time equal to the time required to transmit said predetermined character at the slowest transmission rate allocatable on the channel; and
- at said receiver site storing the received signals, detecting one of said m channel allocation signals and distributing subsequent signals received via the channel to the data receivers in accordance therewith.

* * * * *